(12) United States Patent
Jung et al.

(10) Patent No.: US 10,754,077 B2
(45) Date of Patent: Aug. 25, 2020

(54) LIGHT GUIDE HAVING A PLURALITY OF DIFFUSING OPTICS GRADUALLY CHANGING IN SHAPE AND SIZE FROM THE INCIDENT PORTION OF THE LIGHT GUIDE

(71) Applicant: SL Corporation, Daegu (KR)

(72) Inventors: Seung Gyo Jung, Gyeongsan-si (KR); Kwang Ryeol Park, Gyeongsan-si (KR); Myung Seok Bae, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/566,248

(22) Filed: Sep. 10, 2019

(65) Prior Publication Data

US 2020/0209455 A1 Jul. 2, 2020

(30) Foreign Application Priority Data

Dec. 26, 2018 (KR) .......................... 10-2018-0169290

(51) Int. Cl.
F21V 8/00 (2006.01)

(52) U.S. Cl.
CPC ........... *G02B 6/001* (2013.01); *G02B 6/0036* (2013.01)

(58) Field of Classification Search
CPC .. G02B 6/0038; G02B 6/0054; G02B 6/0036; G02B 6/0033; G02B 6/001
See application file for complete search history.

(56) References Cited

U.S. PATENT DOCUMENTS

| | | | | |
|---|---|---|---|---|
| 5,854,556 A | * | 12/1998 | Steennis | G01R 31/1272 324/541 |
| 6,280,044 B1 | * | 8/2001 | Kusakabe | G02B 6/0028 362/551 |
| 7,478,941 B2 | * | 1/2009 | Wu | G02B 5/021 362/223 |
| 2008/0310187 A1 | * | 12/2008 | Huang | G02B 6/0008 362/615 |

* cited by examiner

*Primary Examiner* — Robert J May
(74) *Attorney, Agent, or Firm* — Nelson Mullins Riley & Scarborough LLP; Kongsik Kim, Esq.

(57) ABSTRACT

A light guide is provided. The light guide includes an optic formed along a length of the light guide. In particular, the optic diffuses light incident from a light source, and the optic is formed to gradually change from a first shape to a second shape as the optic gets farther from an incident portion.

6 Claims, 10 Drawing Sheets

LIGHT GUIDE HAVING A PLURALITY OF DIFFUSING OPTICS GRADUALLY CHANGING IN SHAPE AND SIZE FROM THE INCIDENT PORTION OF THE LIGHT GUIDE

CROSS-REFERENCE TO RELATED APPLICATION

This application claims the benefit of priority from Korean Patent Application No. 10-2018-0169290 filed on Dec. 26, 2018, which application is herein incorporated by reference in its entirety.

BACKGROUND

1. Technical Field

The present disclosure relates to a light guide, and more particularly, to a light guide applied with an optic that gradually changes shape as the optic gets farther from an incident portion.

2. Description of the Related Art

Generally, a vehicle is equipped with various types of vehicle lamps having an illumination function for easily confirming an object disposed in the vicinity of the vehicle in low light conditions (e.g., nighttime), and a signaling function for notifying other vehicles or road users of the operation state of the vehicle.

For example, the vehicle is mainly equipped with a head lamp and a fog lamp for the purpose of the illumination function, and a turn signal lamp, a tail lamp, a brake lamp, side markers for the signaling function, or the like. These vehicle lamps are stipulated by laws and regulations for their installation standards and specifications to allow each function to be fully utilized.

Recently, a light guide has been applied to improve the appearance of a lamp, thereby realizing a lamp having a specific image. An optic is formed in the light guide, and light incident on the light guide is emitted to the outside by the optic. However, there is a problem that the light efficiency is reduced as the light moves along the light guide and is moved by the emitted light.

A diffusion angle of the light is determined based on the optic. When viewed from the side with a viewing angle of 30 degrees as compared with the case of viewing from the front, there is a problem that the visibility deteriorates due to the decrease of the amount of light as the optic gets farther from the incident portion.

SUMMARY

Aspects of the present disclosure provide a light guide applied with an optic that gradually changes shape as the optic gets farther from an incident portion. Problems that the present disclosure addresses are not limited to the above-mentioned problem, and other problems not mentioned may be clearly understood by a person skilled in the art from the following description.

According to an aspect of the present disclosure, a light guide may include an optic formed along a length of the light guide. The light guide may diffuse light incident from a light source, and the optic may be formed to gradually change from a first shape to a second shape as the optic gets farther from an incident portion.

Aspects of the present disclosure may have at least the following benefits. According to aspects of the present disclosure, a light emitting area may be enlarged. Further, a decrease in lighting fill-up may be prevented. The benefits according to the present disclosure are not limited by the contents exemplified above, and more various benefits are included in the present specification.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
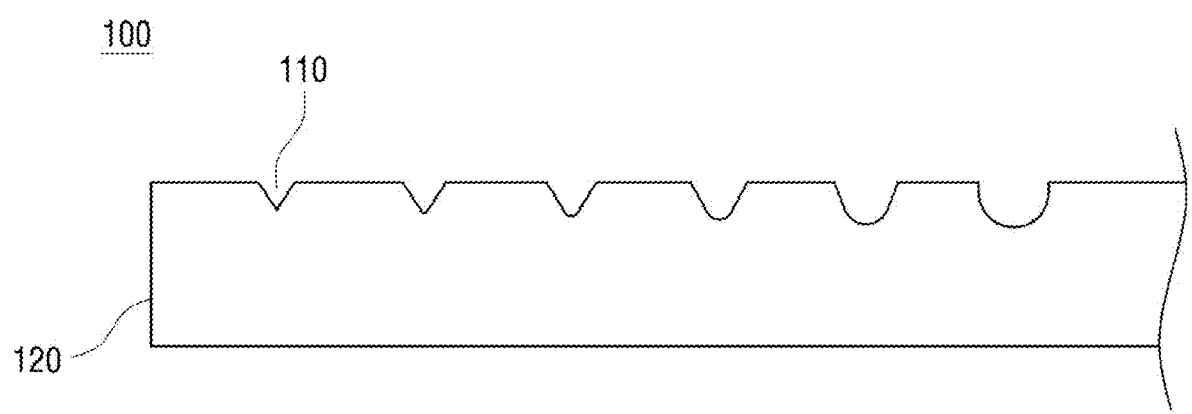
FIG. 1 is a side view of a light guide according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, the exemplary embodiments are provided so that this disclosure will be thorough and complete and will fully convey the concept of the invention to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Exemplary embodiments of the disclosure are described herein with reference to plan and cross-section illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, a light guide according to exemplary embodiments of the present disclosure will be described with reference to the drawings.

Figure 2A:
FIGS. 2A and 2B show an optic formed on a light guide according to an exemplary embodiment of the present disclosure.
Figure 2B:

FIG. 1 is a side view of a light guide according to an exemplary embodiment of the present disclosure. In a light guide 100 according to an exemplary embodiment of the present disclosure, an optic 110 may be formed along a length of the light guide 100. The optic 110 may diffuse light incident from a light source into the light guide 100 and may emit the light to the outside. The light may be totally reflected and be transmitted within the light guide 100, and may collide with the optic 110 and be emitted to the outside. The optic 110 formed in the light guide 100 may be formed as a V-cut as shown in FIG. 2A or as an R-cut as shown in FIG. 2B. The V-cut may be an optic implemented to incline by cutting a surface of the light guide into a V-shape. The optic 110 may be implemented in shapes other than the V-cut or the R-cut.

The light guide 100 may receive the light from the light source through an incident portion 120 and transmit the light along a length direction thereof. For example, the light guide 100 may be formed in an optical fiber shape having a substantially circular cross-section. However, the cross-sectional shape of the light guide 100 is not limited thereto, and may include any geometry such as, for example, an oval, a polygon, a circle with a flat side, and the like. Along the lengthwise direction, the light guide 100 may extend in a linear or a curved line. The light guide 100 may be variously designed based on a light emitting image to be implemented. It may be formed as a linear or a curved line to bend backward, which is away from the incidence portion 120 when viewed from the front.

When the light guide 100 is formed as the curved line, a distance of light diffused from the optic that is disposed far from the incident portion 120 where the amount of light is reduced decreases, and thus, the overall light may appear non-uniform. In particular, when the optic 110 formed in the light guide 100 is implemented in a same shape from the incident portion 120 along the entire length of the light guide 100, there may arise a problem that a hot spot is generated, lighting fill-up is deteriorated, and a light emitting area is narrowed.

Figure 3:
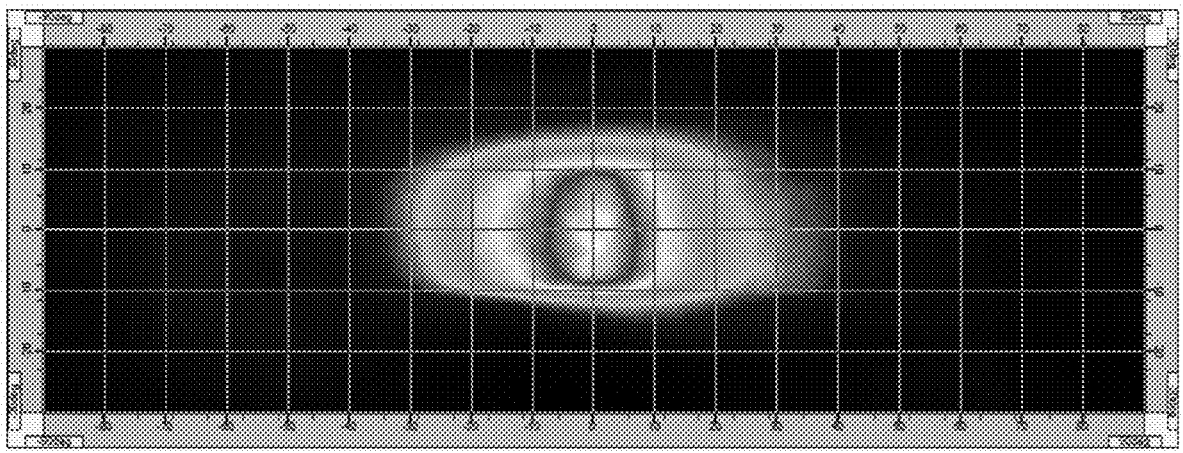
FIG. 3 is a light pattern in which light is diffused in an optic formed by a V-cut according to an exemplary embodiment of the present disclosure.

FIG. 3 is a light pattern in which light is diffused from an optic formed as a V-cut according to an exemplary embodiment of the present disclosure. In particular, FIG. 3 shows light intensities measured across horizontal and vertical viewing angles. As shown in FIG. 3, the V-cut optic may provide visibility within a relatively limited viewing angles (e.g., ±40 degrees horizontally). Accordingly, when the optic is formed as the V-cut, a clear light emitting image may be realized at the incident portion because a diffusion angle of the light is narrow. However, as the light travels along the light guide and the light continues to be emitted to the outside by the optic, the amount of light emitted to the outside decreases as the light travels down the light guide along the length thereof. Accordingly, since the amount of light is reduced at a position far from the incidence portion, there may arise a problem that the light emitting area is reduced along a direction in which the light is viewed.

Figure 4:
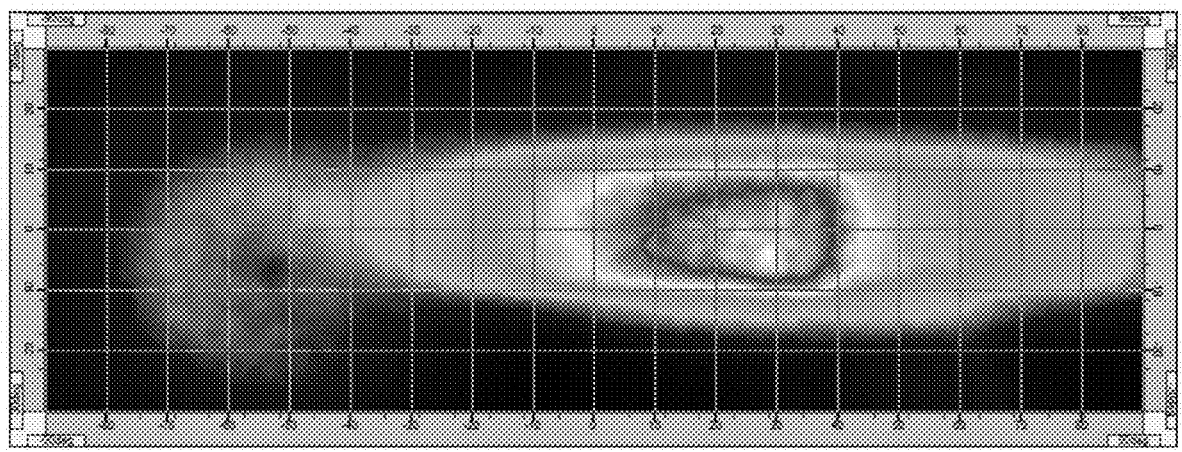
FIG. 4 is a light pattern in which light is diffused in an optic formed by an R-cut according to an exemplary embodiment of the present disclosure.

FIG. 4 is a light pattern in which light is diffused from an optic formed as an R-cut according to an exemplary embodiment of the present disclosure. As shown in FIG. 4, the R-cut optic may provide visibility over a wider viewing angles than the V-cut optic shown in FIG. 3. When the optic is formed as the R-cut or a V-R cut between the V-cut and the R-cut, other than the V-cut, the light may be sufficiently emitted even at the position far from the incidence portion, and the light emitting area may be formed wider due to a diffusion angle of the light that is wider than a diffusion angle of the V-cut. However, when all of the optics are formed as the R-cut, light diffused in the neighboring optics may overlap to cause a hot spot in the incident portion.

Figure 5:
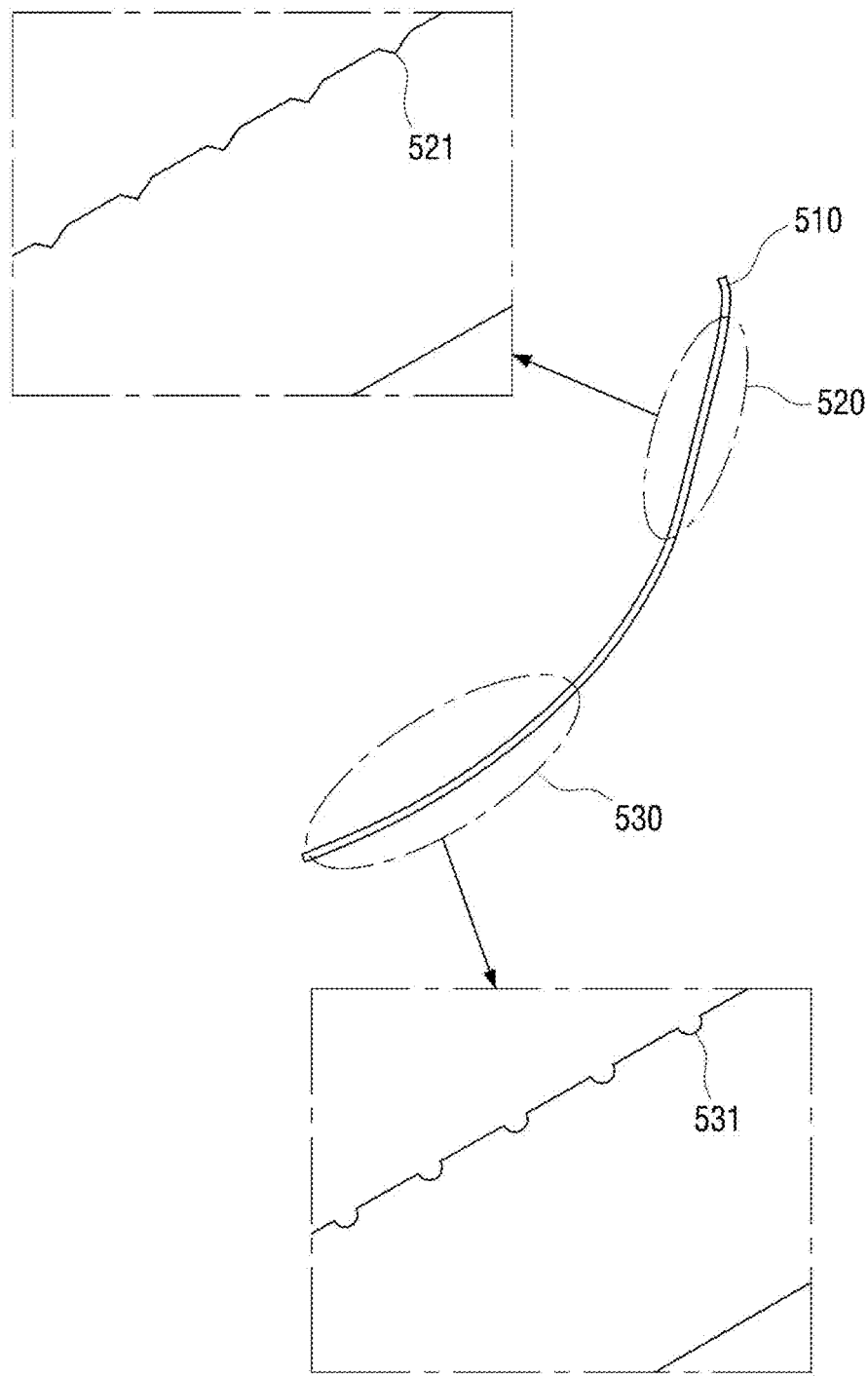
FIG. 5 shows optics by the position of a light guide according to an exemplary embodiment of the present disclosure.

In view of the foregoing, in the light guide 100 according to an exemplary embodiment of the present disclosure, the optic 110 may be implemented in more than one shape. Accordingly, the optic 110 may be formed to gradually change from a first shape to a second shape as the optic gets farther from the incident portion 120. For example, the first shape may be the V-cut, and the second shape may be the R-cut. An optic shape in the incident portion may be formed by the V-cut, and an optic shape may be formed by the R-cut as it is away from the incident portion. As shown in FIG. 5, an optic 520 at a position near the incident portion 510 may be formed as a V-cut 521, and an optic 530 at a position farther from the incident portion 510 may be formed as an R-cut 531. The optic may be formed as the V-cut which does not cause the problem of the hot spot in the incident portion, and the optic may be formed as the R-cut in order to solve the diffusion of light amount which decreases as the optic gets farther from the incident portion.

Figure 6A:
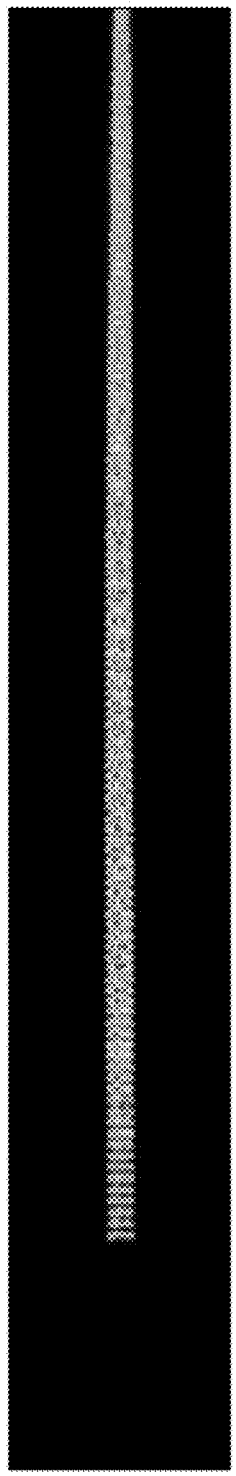
FIGS. 6A and 6B are a front view and a 30 degrees view, respectively, of a light guide applied with V-cut only according to an exemplary embodiment of the present disclosure.
Figure 6B:
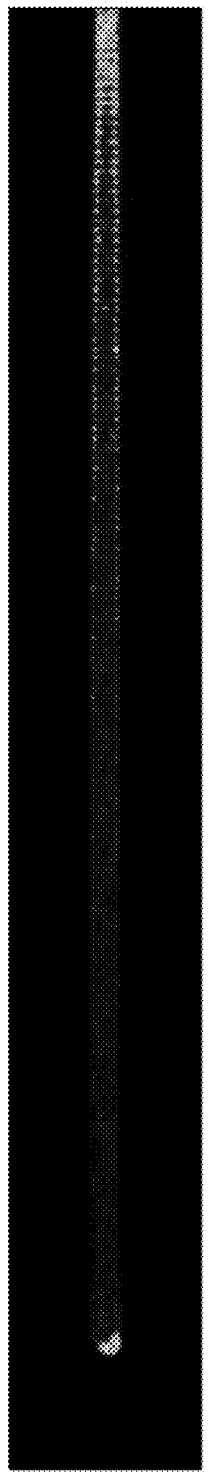
Figure 7A:
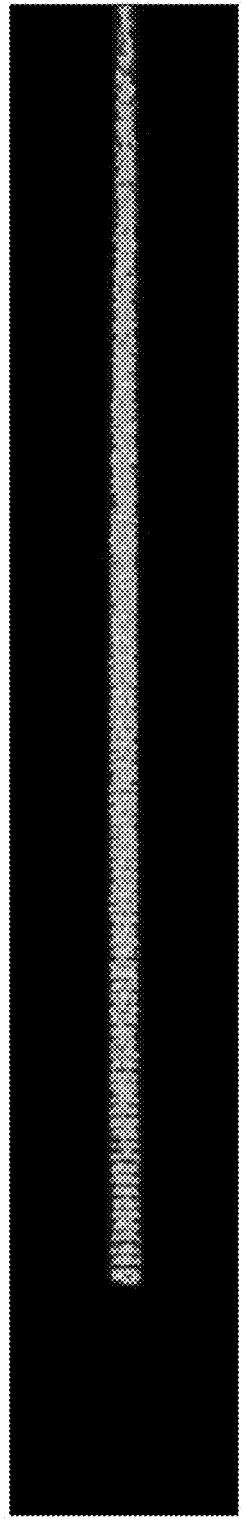
FIGS. 7A and 7B are a front view and a 30 degrees view, respectively, of a light guide according to an exemplary embodiment of the present disclosure.
Figure 7B:
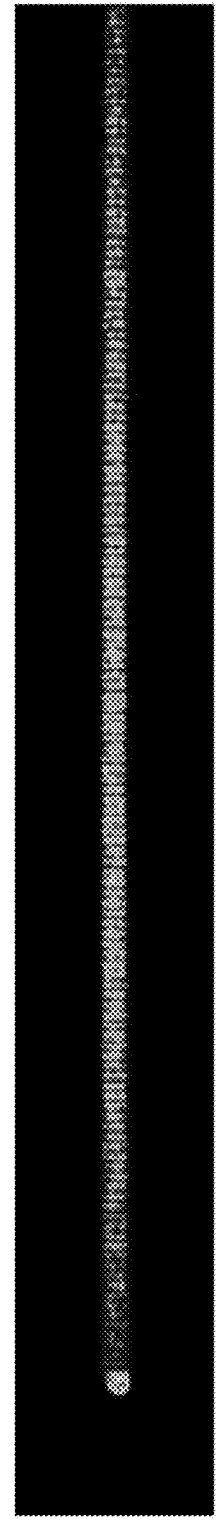

FIGS. 6A, 6B, 7A, and 7B are a front view (FIGS. 6A and 7A) and a 30 degrees view (FIGS. 6B and 7B) of a light guide formed in a curved line as shown in FIG. 5. FIGS. 6A and 6B are a front view and a 30 degrees view, respectively, of a light guide applied with the V-cut only, and FIGS. 7A and 7B are a front view and a 30 degrees view, respectively, of a light guide according to an exemplary embodiment of the present disclosure.

As shown in FIGS. 6A and 6B, for the light guide applied with the V-cut only, the light is uniform throughout the light guide in the front view from the front of the light guide, but the emission of light may not be seen as the optic gets farther from the incident portion, in the 30 degrees view which is observed at 30 degrees with respect to the front direction. In other words, it may be seen that the light emitting area is narrower. In contrast, as shown in FIGS. 7A and 7B, in the light guide according to an exemplary embodiment of the present disclosure, it may be seen that the light is uniform even in the 30 degrees view as well as the front view.

Figure 8:
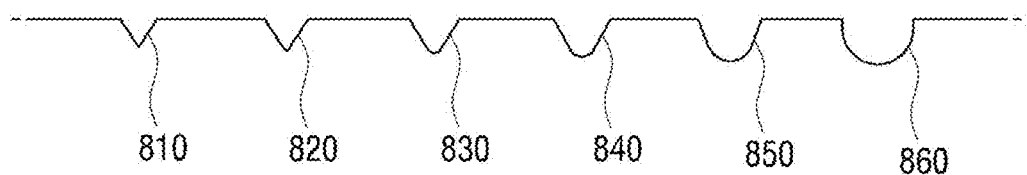
FIG. 8 shows an optic of a light guide according to an exemplary embodiment of the present disclosure.

FIG. 8 is a detailed view of an optic of a light guide according to an exemplary embodiment of the present disclosure, in which an optic 810 at the incident portion side is V-cut shaped and an optic 860 furthest from the incident portion is R-cut shaped. It may be seen that it changes from the V-cut shape to the R-cut shape from the optic 810 at the incident portion side toward the optic 860 furthest from the incident portion.

The diffusion angle of light of the optics formed as described above may increase as the optic gets farther from the incident portion. As seen in FIG. 3, the diffusion angle of the light emitted from the incident portion to the optic may be −20 degrees to +20 degrees. The diffusion angle of the light emitted from the optic furthest from the incident portion may be −40 degrees to +40 degrees. However, the diffusion angle at the position may vary based on the shape of the light guide or the designed amount of light.

A depth of the optic 110 may be increased as the optic gets farther from the incident portion, or a pitch between neighboring optics may be decreased as the optic gets farther from the incident portion. The diffusion angle and the amount of diffused light in the optic 110 may be varied based on the shape, depth, and pitch of the optic.

Figure 9:
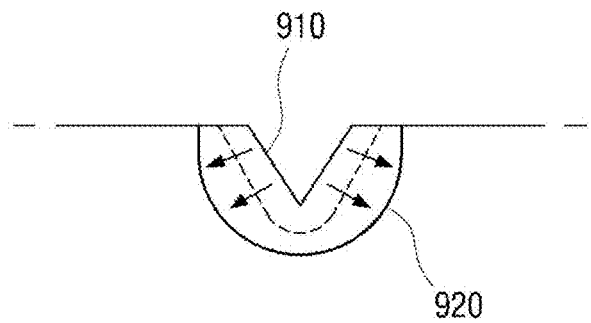
FIGS. 9, 10A, 10B, 11A, and 11B are views for explaining the difference between an optic of an incident portion side and an optic applied at the farthest position from the incident portion according to an exemplary embodiment of the present disclosure.

As shown in FIG. 9, a V-shaped optic 910 closest to the incident portion and an R-cut shaped optic 920 farthest from the incident portion may be different in shape. The optics 110 may be formed to gradually change from the V-cut shape of the optic 910 closest to the incident portion to the R-cut shape of the optic 920 farthest from the incident portion.

Figure 10A:
Figure 10B:
Figure 11A:
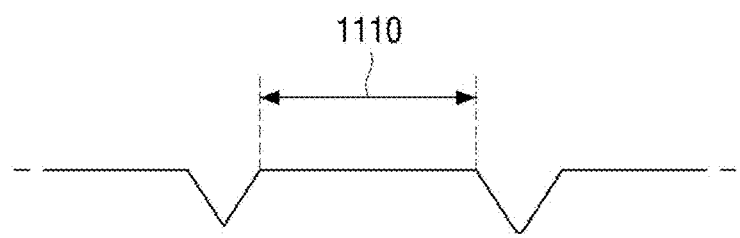
Figure 11B:
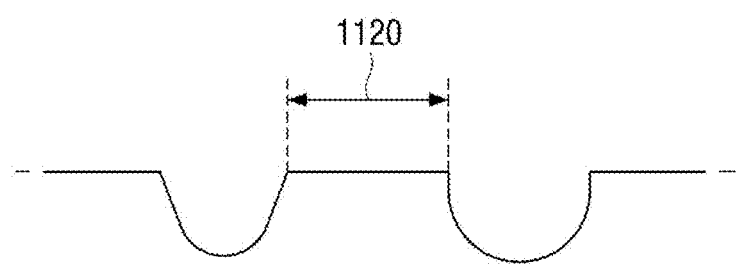

FIGS. 10A and 10B show a first depth 1010 of the V-cut shaped optic closest to the incident portion and a second depth 1020 of the R-cut shaped optic farthest from the incident portion, and it can be seen that the second depth 1020 is greater than the first depth 1010. FIGS. 11A and 11B show a first pitch 1110 where an optic is adjacent to the V-cut shaped optic closest to the incident portion and a second pitch 1120 where an optic is adjacent to the R-cut shaped optic farthest from the incident portion. It can be seen that the second pitch 1120 is smaller than the first pitch 1110.

The light guide applied with the optic implemented as described above may have an effect of increasing the light emitting area.

In concluding the detailed description, those skilled in the art will appreciate that many variations and modifications may be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A light guide, comprising:
an optic formed along a length of the light guide,
wherein the optic diffuses light incident from a light source, and
wherein the optic is formed to gradually change from a first shape to a second shape as the optic gets farther from an incident portion,
wherein a shape of the optic is formed as a V-cut in the incident portion, and is formed as an R-cut as the optic gets farther from the incident portion, and
wherein the shape of the optics that gradually changes from the V-cut to the R-cut prevents a hot spot from forming near the incident portion and prevents light amount from decreasing as the light travels away from the incident portion.

2. The light guide of claim 1, wherein a diffusion angle of light increases as the optic gets farther from the incidence portion.

3. The light guide of claim 1, wherein a diffusion angle of light at the incidence portion of the optic is about −20 degrees to about +20 degrees.

4. The light guide of claim 1, wherein a depth of the optic increases as the optic gets farther from the incident portion.

5. The light guide of claim 1, wherein a pitch between neighboring optics becomes smaller as the optic gets farther from the incident portion.

6. The light guide of claim 1, wherein the light guide is formed as a linear or a curved line.

* * * * *